United States Patent
Zhang et al.

(10) Patent No.: US 11,206,167 B1
(45) Date of Patent: Dec. 21, 2021

(54) METHOD FOR CARRIER FREQUENCY AND TIME OFFSET ESTIMATION FOR MOBILE COMMUNICATIONS EQUIPMENT

(71) Applicant: Hong Kong Applied Science And Technology Research Institute Co., Ltd., Shatin (HK)

(72) Inventors: Haiming Zhang, Ma On Shan (HK); Eddy Chiu, Lai Chi Kok (HK); Man-Wai Kwan, Ma On Shan (HK); Ho Yin Chan, Kowloon (HK); Chunhua Sun, Tsuen Wan (HK); Kong Chau Tsang, Kowloon (HK)

(73) Assignee: Hong Kong Applied Science and Technology Research Institute Company Limted, Shatin (HK)

( * ) Notice: Subject to any disclaimer, the term of this patent is extended or adjusted under 35 U.S.C. 154(b) by 0 days.

(21) Appl. No.: 16/894,955

(22) Filed: Jun. 8, 2020

(51) Int. Cl.
| | |
|---|---|
| *H04L 27/14* | (2006.01) |
| *H04L 27/16* | (2006.01) |
| *H04L 27/22* | (2006.01) |
| *H04L 27/26* | (2006.01) |
| *H04L 27/00* | (2006.01) |

(52) U.S. Cl.
CPC ...... *H04L 27/2657* (2013.01); *H04L 27/0014* (2013.01); *H04L 27/2675* (2013.01); *H04L 2027/0026* (2013.01); *H04L 2027/0083* (2013.01)

(58) Field of Classification Search
CPC ............ H04L 27/2657; H04L 27/2675; H04L 27/0014; H04L 2027/0026; H04L 5/0007; H04L 27/2688; H04W 56/0035

USPC ................. 375/326, 344, 346, 342, 316
See application file for complete search history.

(56) References Cited

U.S. PATENT DOCUMENTS

| | | | |
|---|---|---|---|
| 2016/0285667 A1 | 9/2016 | Deng et al. | |
| 2018/0014268 A1* | 1/2018 | Kuppusamy | ...... H04W 56/0035 |
| 2019/0104009 A1* | 4/2019 | Fan | ...... H04L 27/2688 |
| 2019/0238208 A1 | 8/2019 | Tang et al. | |
| 2020/0059874 A1* | 2/2020 | Noh | ...... H04L 5/0007 |

FOREIGN PATENT DOCUMENTS

| | | |
|---|---|---|
| CN | 108429710 A | 8/2018 |
| CN | 109561495 A | 4/2019 |
| CN | 109587771 A | 4/2019 |
| CN | 109803369 A | 5/2019 |
| WO | 2019032853 A | 2/2019 |

OTHER PUBLICATIONS

International Search Report; PCT/CN2020?095180; dated Feb. 20, 2021.

* cited by examiner

*Primary Examiner* — Phuong Phu

(57) ABSTRACT

A method of performing carrier frequency offset (CFO) estimation and/or time offset (TO) estimation at a radio equipment in a mobile communications system. The method allows, for each of a plurality of synchronization signal (SS) blocks (SSBs) in a SS Burst detected at said radio equipment, determining a CFO estimation and/or a TO estimation based on network information signal prediction. The method includes selecting at least some of said detected SSBs in said SSB Burst and combining the CFO estimations and/or the TO estimations to obtain improved CFO compensation and/or TO compensation for signal processing at said radio equipment.

18 Claims, 10 Drawing Sheets

METHOD FOR CARRIER FREQUENCY AND TIME OFFSET ESTIMATION FOR MOBILE COMMUNICATIONS EQUIPMENT

FIELD OF THE INVENTION

The invention relates to a method for carrier frequency offset (CFO) estimation and/or time offset (TO) estimation for radio equipment for fifth generation (5G) mobile communications networks as well as other compatible communications systems using network information signal prediction and multi-beam combining.

BACKGROUND OF THE INVENTION

Time and frequency synchronization are critical in wireless communications systems for reducing signal distortion and mitigating interference. In general, synchronization includes initial synchronization and run-time tracking. 5G new radio (NR) networks have large frequency and time offsets due to high carrier frequencies and large bandwidths. Therefore, the radio equipment in 5G NR networks needs an accurate TO and CFO estimation method to mitigate, compensate and/or correct the offsets and ensure network quality and availability.

A 5G base station (BS) periodically transmits synchronization signals (SS) and Physical Broadcast Channel (PBCH) signal that are collectively referred to as the SS/PBCH Block (SSB) or SS Block. By receiving and decoding an SSB, a user equipment (UE) or a network sniffer device. Cell Search is the procedure by which a UE or network sniffer device acquires time and frequency synchronization within the cell and obtains system information about the cell. In 5G NR, the Cell Search concept is similar to that in fourth generation (4G) Long Term Evolution (LTE) networks in terms of detecting the Primary Synchronization Signal (PSS) and the Secondary Synchronization Signal (SSS) and receiving MIB and System Information Blocks (SIBs).

There are two methods by which a UE can access a 5G NR cell. In non-standalone mode (NSA), referred to as EUTRA-NR Dual Connectivity (EN-DC), a UE is first attached to the 4G LTE cell and obtains Cell Search information about the 5G NR cell such as carrier frequency, PCI, Random Access Channel (RACH) parameters, etc. via Radio Resource Control (RRC) reconfiguration messages from the LTE eNodeB (base station). Based on the 5G NR Cell Search information, the UE can attempt to synchronize and attach to the 5G NR cell.

In standalone (SA) mode, the 5G NR Cell Search procedure follows the following steps: (i) the UE tunes to a specific carrier frequency; (ii) the UE tries to detect PSS and SSS and, if the UE fails to detect these signals, it attempts to tune to a next carrier frequency; once the UE successfully detects PSS/SSS, the UE tries to decode the PBCH; and, once the UE has successfully decoded the PBCH, it tries to decode the System Information Block (SIB) that is transmitted by the 5G NR gNodeB (base station) over Physical Downlink Shared Channel (PDSCH) and includes the RACH resources. The 5G NR synchronization procedure is based on beam management, where the UE acquires basic system information by detecting the MIB in the PBCH which could be used for beam measurement and beam determination and the SIB in the PDSCH which could be used for beam reporting.

The UE decodes the PSS, SSS and PBCH Demodulation Reference Symbols (DMRS) signals to obtain the PCI and beam management information. PSS, SSS and PBCH are transmitted in the SSB which consists of four Orthogonal Frequency Division Multiplexing (OFDM) symbols in the time domain comprising one symbol for PSS, one symbol for SSS, and two symbols for PBCH as shown in FIG. 1 which illustrates the resource allocation for an SSB. Time synchronization, in terms of symbol-level and slot-level, and frequency synchronization are realized via PSS/SSS.

As shown in FIG. 1, the SSB comprises four OFDM symbols in the time domain and 240 sub-carriers in the frequency domain. The PSS has a total of 127 Resource Elements (REs), the SSS also has 127 REs and the PBCH has 576 REs.

SSBs are transmitted in a batch by forming an SS Burst having one SSB per beam that is used during beam sweeping by changing beam direction for each SSB transmission. Under a Beam Sweeping mechanism performed by the BS, the UE take measurements and identifies the best beam for that UE.

As shown in FIG. 2, a collection of SS Bursts is referred to as an SS Burst Set. Both SS Burst and SS Burst Set may contain one or more elements, while a maximum number L of SSBs in an SS Burst is frequency-dependent and can be as few as L=4 (below 3 GHz), L=8 (3 to 6 GHz), or up to L=64 (6 to 52.6 GHz). SS Blocks are transmitted towards UEs at regular intervals based on a periodicity set (i.e. 5/10/20/40/80/160 ms). Multiple SSBs (SS Blocks) are carried in each SS Burst. The SSBs are grouped into half of one radio frame of the SS Burst. The UE decodes the PBCH and DMRS to determine which half of a radio frame the SSB is located in. The frame and slot timings are defined by the identifiers or indexes of the SSBs and acquired by the UE.

The 5G NR gNodeB (base station) defines multiple candidate positions for SSBs within a radio frame, and this number corresponds to the number of beams radiated in a certain direction. Each SSB can be identified by a unique number called the SSB index. The beam measurement result of each SSB is dependent on where the UE is located within the cell, and the beam determination and reporting is based on the measurement results and the SSB index. The UE measures the signal strength of the PBCH DMRS of each SSB it detects within a certain period (a period of one SSB Burst). From the measurement results, the UE can identify the SSB indices with the strongest signal strengths. The SSBs with the strongest signal strengths are the best beams for that UE.

FIG. 3 illustrates two UEs, UE #1 & UE #2, located at different positions within a cell attempting to identify the SSB index value for the beam which is best suited for that UE. The number of different beams being transmitted is determined by how many SSBs are being transmitted within an SS Burst. Each SSB is identified by its SSB index (SSB0 to SSBL−1). Each SSB is transmitted via a specific beam radiated in a certain direction. Multiple UEs may be located at various places around a gNodeB. Each UE measures the signal strength of each SSB it detects within a period of one SSB Burst. From the measurement results, a UE can identify the SSB index with the strongest signal strength. The SSB with the strongest signal strength is the best beam for that UE. In FIG. 3, it can be seen that the relative signals strengths of the beams for the various SSBs differs at UE #1 compared to UE #2 where the SSB having index value SSB1 is best suited for UE #1 and the SSB having index value SSB3 being best suited for UE #2.

The UE chooses the best beam and decodes the PBCH contents information such as signal frame number (SFN), SSB index, raster offset, default downlink (DL) numerology, remaining minimum system information (RMSI) configuration, DMRS location, etc. Successful decoding of PBCH enables the UE to receive subsequent physical downlink control channel signals (PDCCHs) and PDSCHs which schedule RMSI and Other System Information (OSI). As indicated above, the UE acquires basic system information by detecting the MIB in the PBCH and the SIB from the PDSCH.

FIG. 4 illustrates some high-level differences between the 4G LTE SSB (SS Block) which is shown uppermost in FIG. 4 and the 5G NR SSB (SS Block) which is shown lowermost in FIG. 4. The time Domain transmission pattern of SS Block in 5G NR is more complicated than 4G LTE SS Block. In 4G LTE, SS and PBCH time domain and frequency domain positions are fixed and transmitted periodically every 10 ms. In 5G NR, SSBs time domain and frequency domain positions are flexible and may be transmitted infrequently up to every 160 ms. In 5G NR, there are many different time domain patterns of SSB transmission.

It will be understood that the more SSBs transmitted within the same period, the greater probability of obtaining more accurate synchronization information. However, in 5G NR, due to the absence of frequently transmitted cell-specific reference signals (RSs), it is desirable to have accurate time and frequency offset estimation with each SSB by making use of as many RSs as possible.

CN109561495 discloses a time-frequency tracking method. Reference signals for time-frequency estimation at quasi-co-sites are subjected to time-frequency tracking, and a time-frequency offset estimation range and estimation values corresponding to all reference signals for time-frequency estimation are acquired. According to the acquired time-frequency offset estimation range and the estimation values corresponding to all reference signals, time-frequency offset instantaneous values are calculated. When the above scheme is applied, the existing reference signals can be effectively used for time-frequency tracking, and the reference signal range of time-frequency tracking can be enlarged thus improving the poor performance of time-frequency tracking caused by time-frequency tracking only based on TRS (Tracking Reference Signal) and improving the tracking range and the tracking accuracy. This disclosure utilizes a conventional beam selection method as described above.

WO2019032853 discloses a method for obtaining a resource for accessing a target cell in a network. The method includes detecting plural beams associated with the target cell and determining one or more of the plural detected beams meeting a threshold for performing random access. The method involves evaluating if a Physical Random-Access Channel (PRACH) resource is associated with the one or more determined beams meeting the threshold and selecting one of the evaluated beams exhibiting a reference signal received power (RSRP) above a predetermined value. Then, the PRACH resource associated with the selected beam is selected. This disclosure employs a threshold to select a beam but only one beam is selected.

US2019/0238208 discloses a method in which the UE receives training signals from a plurality of transmit-receive points (TRPs) associated with the gNodeB. Each training signal may comprise a reference signal resource identifier (ID) to indicate a corresponding TRP and a corresponding transmit direction of a plurality of transmit directions. The UE may, for each transmit direction of the plurality of transmit directions, determine an average signal quality measurement based on individual signal quality measurements in multiple receive directions. The UE may select, for reporting to the gNodeB, a subset of the average signal quality measurements to ensure that the average signal quality measurements excluded from the subset are less than or equal to a minimum value of the average signal quality measurements in the subset. This disclosure uses a conventional method for establishing frequency and time offset estimations.

What is desired is a method to provide more accurate CFO and/or TO estimation values for mobile communications network radio equipment, especially 5G radio equipment.

OBJECTS OF THE INVENTION

An object of the invention is to mitigate or obviate to some degree one or more problems associated with known methods of CFO and/or TO estimation using network information signal prediction and multi-beam combining in mobile communications networks and, more particularly, in 5G NR networks.

The above object is met by the combination of features of the main claims; the sub-claims disclose further advantageous embodiments of the invention.

Another object of the invention is to provide a method to determine more accurate CFO and TO values for 5G radio equipment using more signals as reference signal in addition to SS signals.

Another object of the invention is to provide a method to determine more accurate CFO and TO values for 5G equipment using combinations of values from multiple beams.

Another object of the invention is to provide a method to determine more accurate CFO and TO estimation values for 5G radio equipment which combines one or more useful offset estimation values from selected beams with corresponding weights to obtain more accurate compensation values.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method of performing CFO estimation and/or TO estimation at a radio equipment in a wireless communication system. The method comprises, for each of a plurality of SSBs in a SS Burst received at said radio equipment, determining a CFO estimation and/or a TO estimation. The method includes combining, for at least some of said detected SSBs, the CFO estimations and/or the TO estimations from PSS, SSS and PBCH of said SSBs to obtain improved CFO compensation and/or TO compensation for signal processing at said radio equipment. A group of said SSBs may be selected by comparing a value of a parameter of each SSB's beam to a threshold and selecting those beams which equal or exceed the threshold. The parameter of the beam may comprise a received signal strength parameter or a reference signal received power parameter. Preferably, only the CFO estimations and/or the TO estimations of the selected beams are used to obtain improved CFO compensation and/or TO compensation for signal processing at said radio equipment.

In a first main aspect, the invention provides a method of performing CFO estimation and/or TO estimation at a radio equipment in a mobile communications system, the method comprising: for each of a plurality of SSBs in a SS Burst detected at said radio equipment, determining a CFO estimation and/or a TO estimation based on network information signal prediction; and for at least some of said detected SSBs, combining the CFO estimations and/or the TO estimations to obtain improved CFO compensation and/or improved TO compensation for signal processing at said radio equipment.

Preferably, the method includes, for each of said plurality of SSBs, determining: (i) a frequency domain CFO estimation and a frequency domain TO estimation with added PBCH signal as a reference signal by using signal prediction; and (ii) a time domain CFO estimation and a time domain TO estimation; and performing the step of: combining the frequency domain/time domain CFO and TO estimations for said at least some of said plurality of SSBs to obtain improved CFO and TO compensation for signal processing at said radio equipment.

Preferably also, the method includes updating a signal frame number (SFN) and respective payloads for each SSB on receiving a next SS Burst in a SS Burst Set.

Preferably, the radio equipment comprises a user equipment (UE) or a network sniffer device in a 5G New Radio (NR) mobile communications network.

In a second main aspect, the invention provides a radio equipment in a mobile communications system, the radio equipment comprising: a memory storing machine-readable instructions; and a processor for executing the machine-readable instructions such that, when the processor executes the machine-readable instructions, it configures the radio equipment to: for each of a plurality of synchronization signal (SS) blocks (SSBs) in a SS Burst detected at said radio equipment, determine a CFO estimation and/or a TO estimation; and for at least some of said detected SSBs, combine the CFO estimations and/or the TO estimations to obtain improved CFO compensation and/or improved TO compensation for signal processing at said radio equipment.

In a third main aspect, the invention provides a non-transitory computer-readable medium storing machine-readable instructions, wherein, when the machine-readable instructions are executed by a processor, they configure the processor to: for each of a plurality of synchronization signal (SS) blocks (SSBs) in a SS Burst detected at said radio equipment, determine a CFO estimation and/or a TO estimation based on network information signal prediction; and for at least some of said detected SSBs, combine the CFO estimations and/or the TO estimations to obtain improved CFO compensation and/or improved TO compensation for signal processing at said radio equipment.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
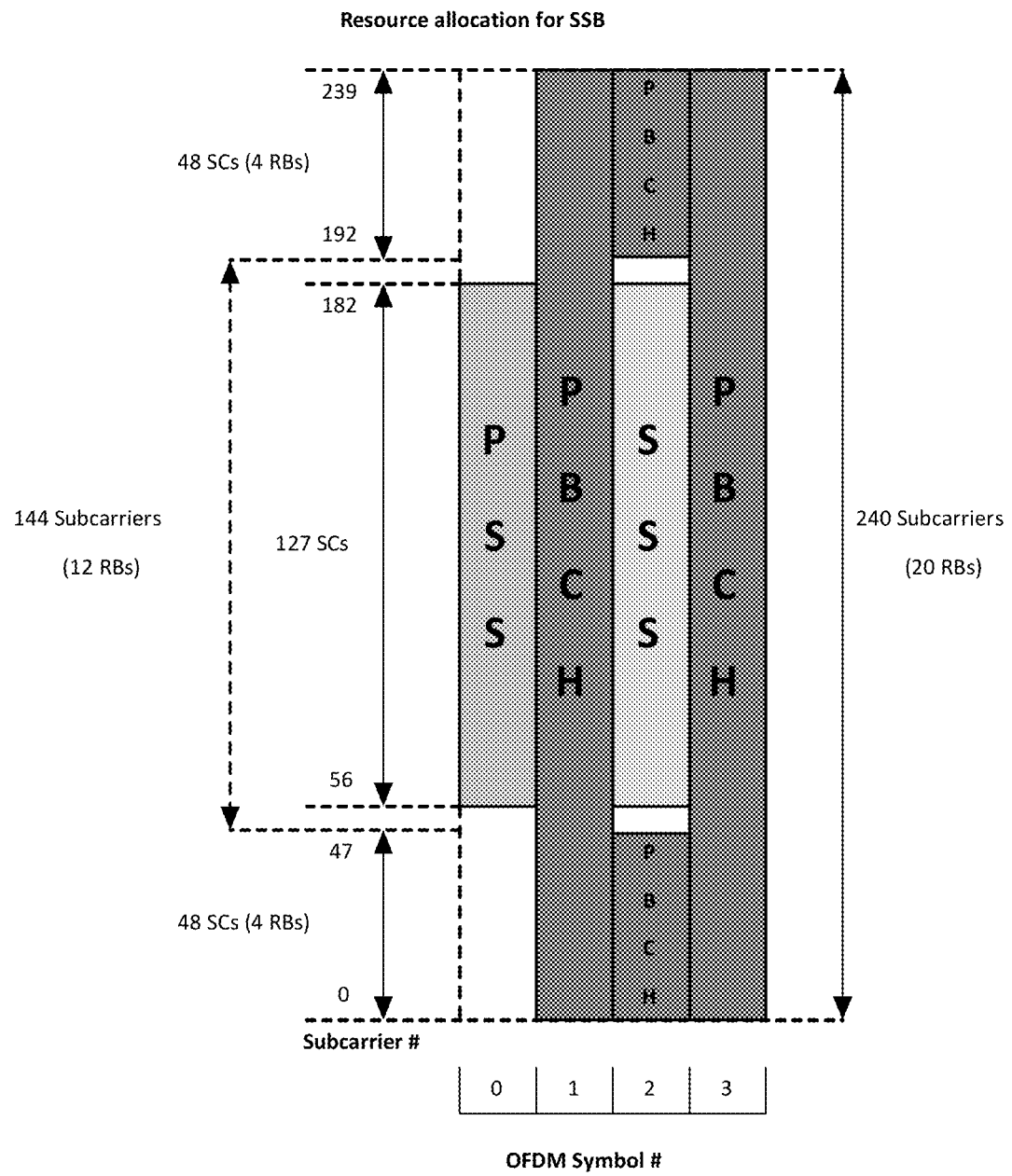
FIG. 1 is a schematic diagram illustrating resource allocation for an SSB.
Figure 2:
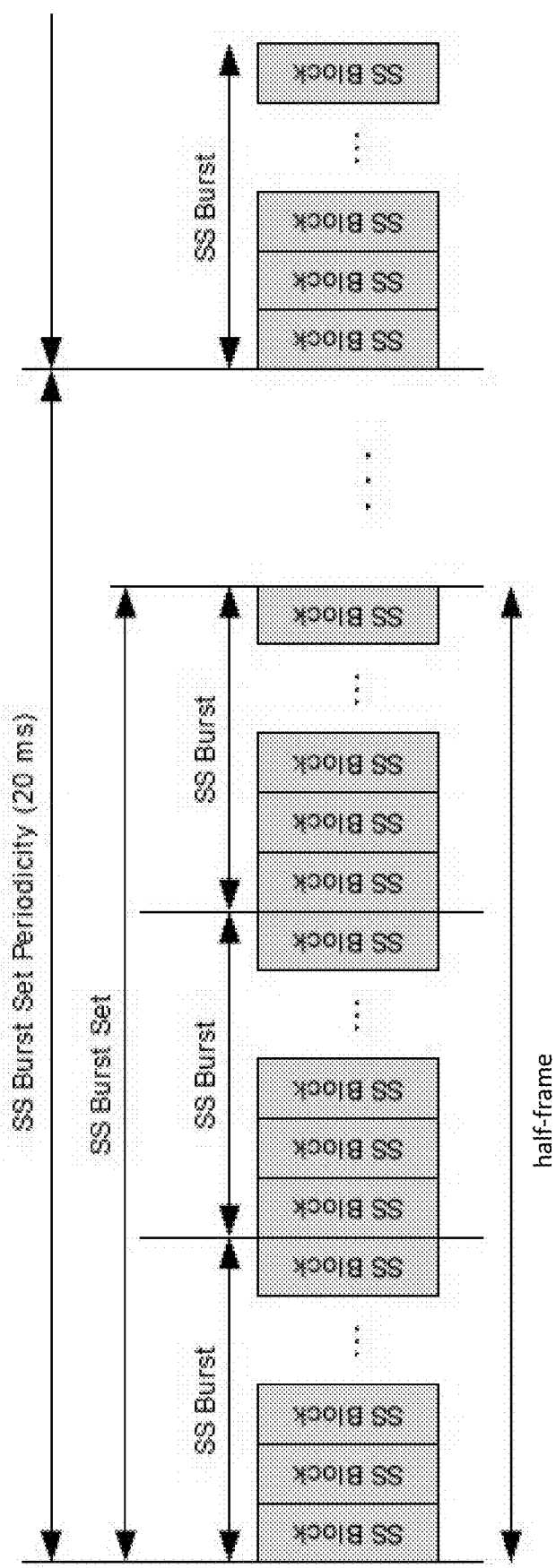
FIG. 2 is a schematic diagram illustrating the structure of a SS Burst Set.
Figure 3:
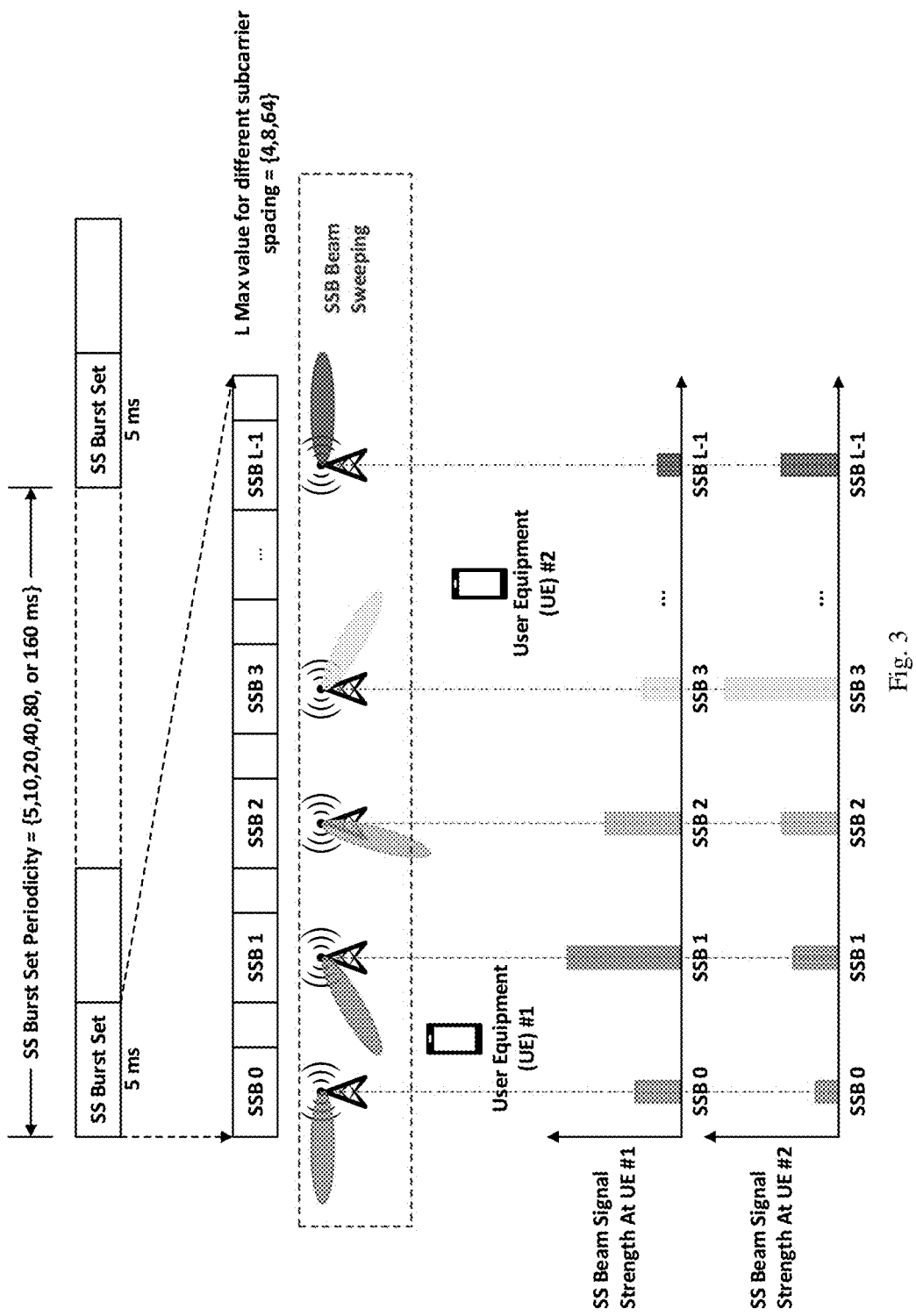
FIG. 3 illustrates SSB detection at different UEs in a cell.
Figure 4:
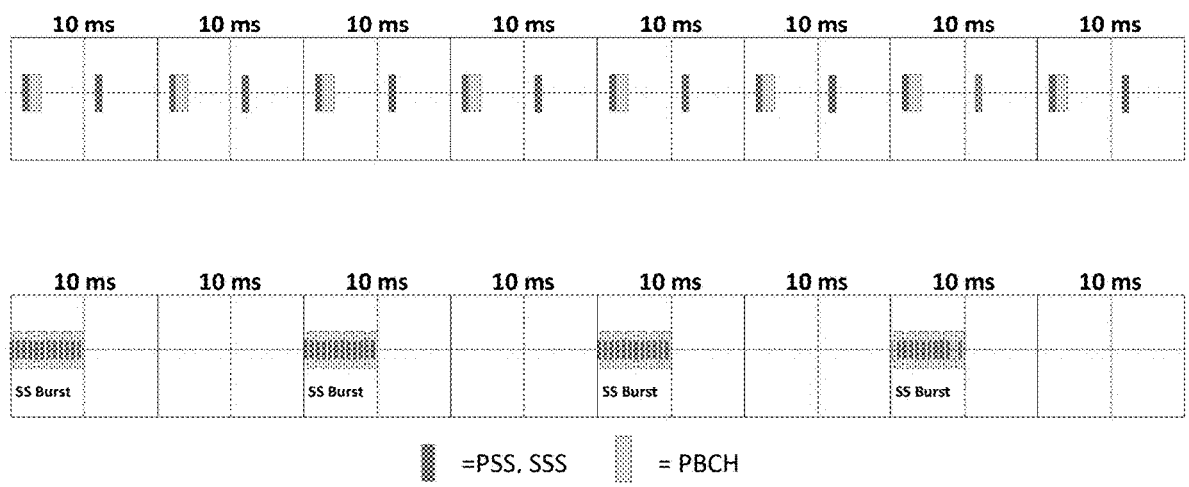
FIG. 4 illustrates differences between the 4G LTE SSB (SS Block) and 5G NR SSB (SS Block)

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References to 5G radio equipment in the following description do not exclude the application of the methods described herein to radio equipment of compatible communications systems.

5G NR is the new mobile communication standard presented by the 3rd generation partnership project (3GPP) and presents a major improvement over the 4G LTE-advance (LTE-A) standard, where the main focus is on enhanced mobile broadband, ultra-reliable and low latency communications, and massive machine-type communications. To achieve these goals, 3GPP has introduced a unified network architecture, with a new physical layer design that supports very high carrier frequencies, large frequency bandwidths, and new techniques such as massive multiple-input and multiple-output (MIMO), and beamforming. Those major modifications increase the synchronization procedure challenges. In fact, the very high defined carrier frequencies result in large values of CFOs and TOs, which need an accurate and expensive oscillator to align a transmitter and a radio equipment for interference-free communications. The sources of interference are mainly related to the imperfections of OFDM systems, which suffer from the CFOs and TOs that result in inter-carrier interference (ICI) and inter-symbol interference (ISI). The TO is due to the transmission delay, where the transmitted signal reaches the radio equipment delayed in time. In this case, the radio equipment does not know when the transmitter sent a new burst. Usually, the normalized TO is considered, which is equal to the number of samples between the transmitted signal and the received signal. If the normalized TO is larger than the cyclic prefix (CP) length, then a misalignment of the fast Fourier Transform (FFT) window can be observed, which results in ISI and ICI. Otherwise, only a CFO can be observed. The estimation and correction of the TO should be done in the pre-FFT synchronization stage, by using one of a number of known synchronization algorithms. Auto-correlation and cross-correlation algorithms are well known and are used in wireless communication systems. In the first algorithm, the received signal is correlated with a delayed version of the same signal. However, in the second algorithm, the received signal is correlated with a stored pattern known to the radio equipment to estimate the TO. Beside the TO, the errors in the transmitter and the radio equipment oscillators result in CFO, which is a linear phase over the time domain samples and it causes ICI over the subcarriers. In contrast to the TO, the impact of CFO increases in time as it is directly proportional to the discrete time index. The CFO in OFDM is usually normalized to the sub-carrier spacing as the ratio between the frequency error and the sub-carrier spacing. In addition, a mismatch between the sampling frequency at both transmitter and radio equipment presents another source for the TO.

In addition, the 3GPP has introduced a new high dimensional phased arrays-based mechanism to establish highly directional transmission links between the gNodeB and the user UEs. This mechanism requires fine alignment of the transmitter and the radio equipment beams, achieved through a set of operations known as beam management. The beam management needs complex algorithms and high-level processing at gNodeBs and UEs to perform a variety of control tasks, including initial access, and beam tracking, which increase the synchronization procedure challenges.

In contrast to the known methods of determining CFO and/or TO estimation, the invention relates to a method of CFO and/or TO estimation for 5G radio equipment in which the whole SSB (SS Block) is used as a reference signal. The method of the invention preferably includes a technique of multi-beam combining in order to get more accurate TO and/or CFO estimation values.

Figure 5:
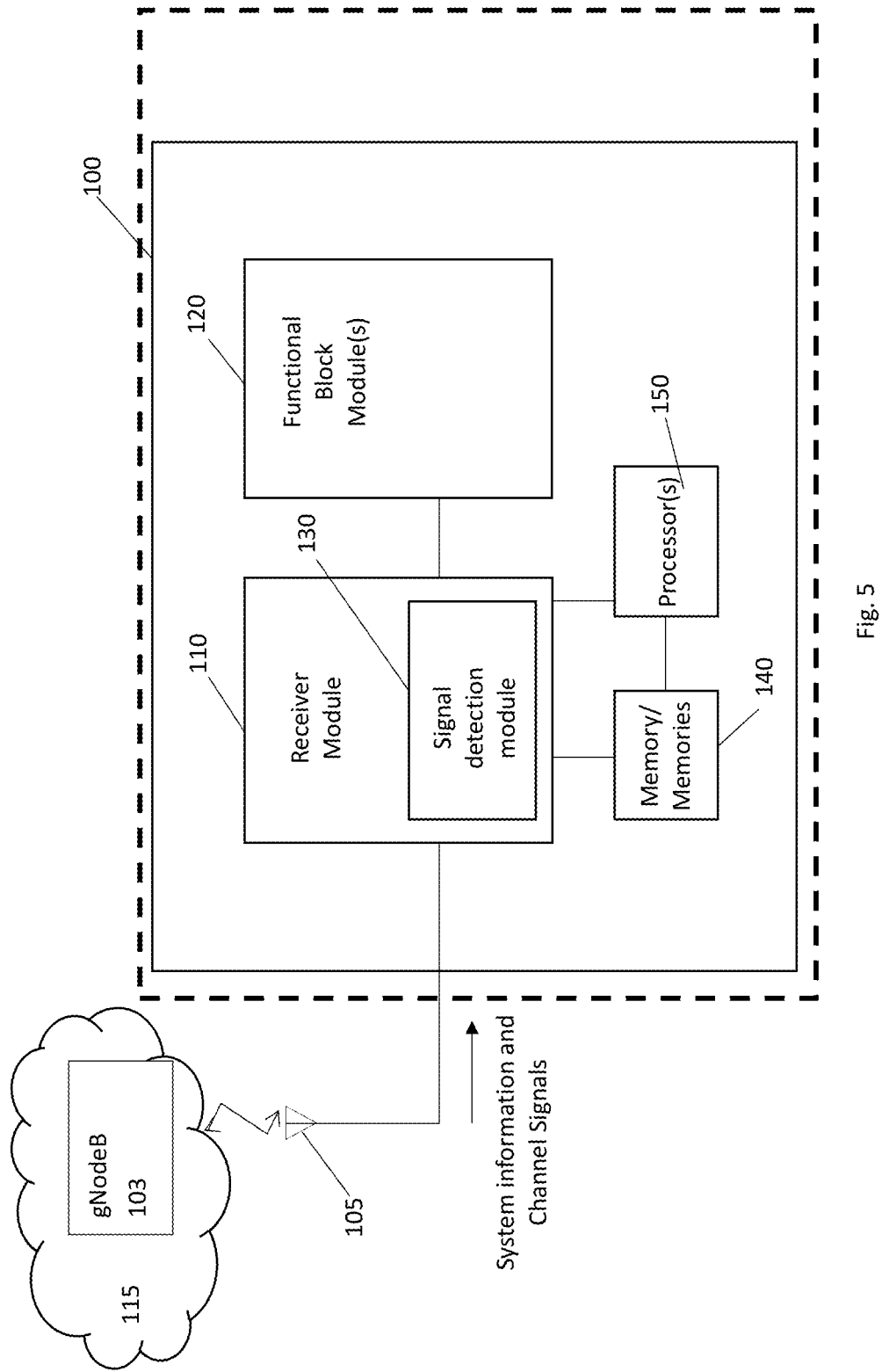
FIG. 5 is a block schematic diagram of an improved radio equipment device in accordance with the invention.

FIG. 5 shows an exemplary embodiment of an improved radio equipment device 100 in accordance with concepts of the present invention. In the illustrated embodiment, the radio equipment device 100 may comprise a communication equipment such as a UE (denoted by dashed line in FIG. 5) communicatively connected to a gNodeB (base station (BS) 103) operating in a 5G NR communications system environment 115, although the improved radio equipment device 100 of the invention is not limited to operating in a NR 5G communications system but could comprise a radio equipment device for a 4G cellular network or any suitable cellular network. In another embodiment, the radio equipment device 100 may comprise a network sniffer device communicatively connected to or forming part of the gNodeB (BS) 103.

The radio equipment device 100 may comprise a plurality of functional blocks for performing various functions thereof. For example, the radio equipment device 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of received information and channel signals in accordance with the invention. Information and channel signals may be received via an antenna module 105.

Although the signal detection module 130 is shown as being deployed as part of the receiver module 110 (e.g.

comprising a portion of the radio equipment module control and logic circuits), there is no limitation to such a deployment configuration according to the concepts of the invention. For example, the signal detection module 130 may be deployed as a functional block of radio equipment device 100 that is distinct from, but connected to, receiver module 110. The signal detection module 130 may, for example, be implemented using logic circuits and/or executable code/machine readable instructions stored in a memory 140 of the UCI radio equipment device 100 for execution by a processor 150 to thereby perform functions as described herein. For example, the executable code/machine readable instructions may be stored in one or more memories 140 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g. application specific integrated circuit (ASIC), field programmable gate array (FPGA), graphics processing unit (GPU), and/or the like configured to perform functions of the signal detection module 130 as described herein.

In one embodiment of the invention, the signal detection module 130 performs a method of CFO estimation and/or TO estimation on each of a plurality of SSBs in a SS Burst detected at said radio equipment device 100. The signal detection module 130 then determines a combined CFO estimation value and/or a combined TO estimation value from the CFO estimations and/or TO estimations for the detected SSBs. The resultant combined CFO estimation value and/or combined TO estimation value is used for signal processing at the radio equipment device 100.

More specifically, it is preferred that the signal detection module 130 determines a frequency domain CFO estimation and a frequency domain TO estimation and, additionally or alternatively, determines a time domain CFO estimation and a time domain TO estimation. The signal detection module 130 then obtains a combined CFO estimation value and a combined TO estimation value by combining the frequency domain CFO estimations and by combining the frequency domain TO estimations for said at least some of said detected SSBs and, additionally or alternatively, by combining the time domain CFO estimations and by combining the time domain TO estimations for said at least some of said detected SSBs to obtain improved CFO and TO compensation for signal processing at said radio equipment device 100.

More preferably, the signal detection module 130 determines a frequency domain CFO estimation and a frequency domain TO estimation and a time domain CFO estimation and a time domain TO estimation for each of the detected SSBs and then combines the frequency domain/time domain CFO and TO estimations for at least some of said detected SSBs to obtain improved CFO and TO compensation for signal processing at said radio equipment device 100.

Figure 6:
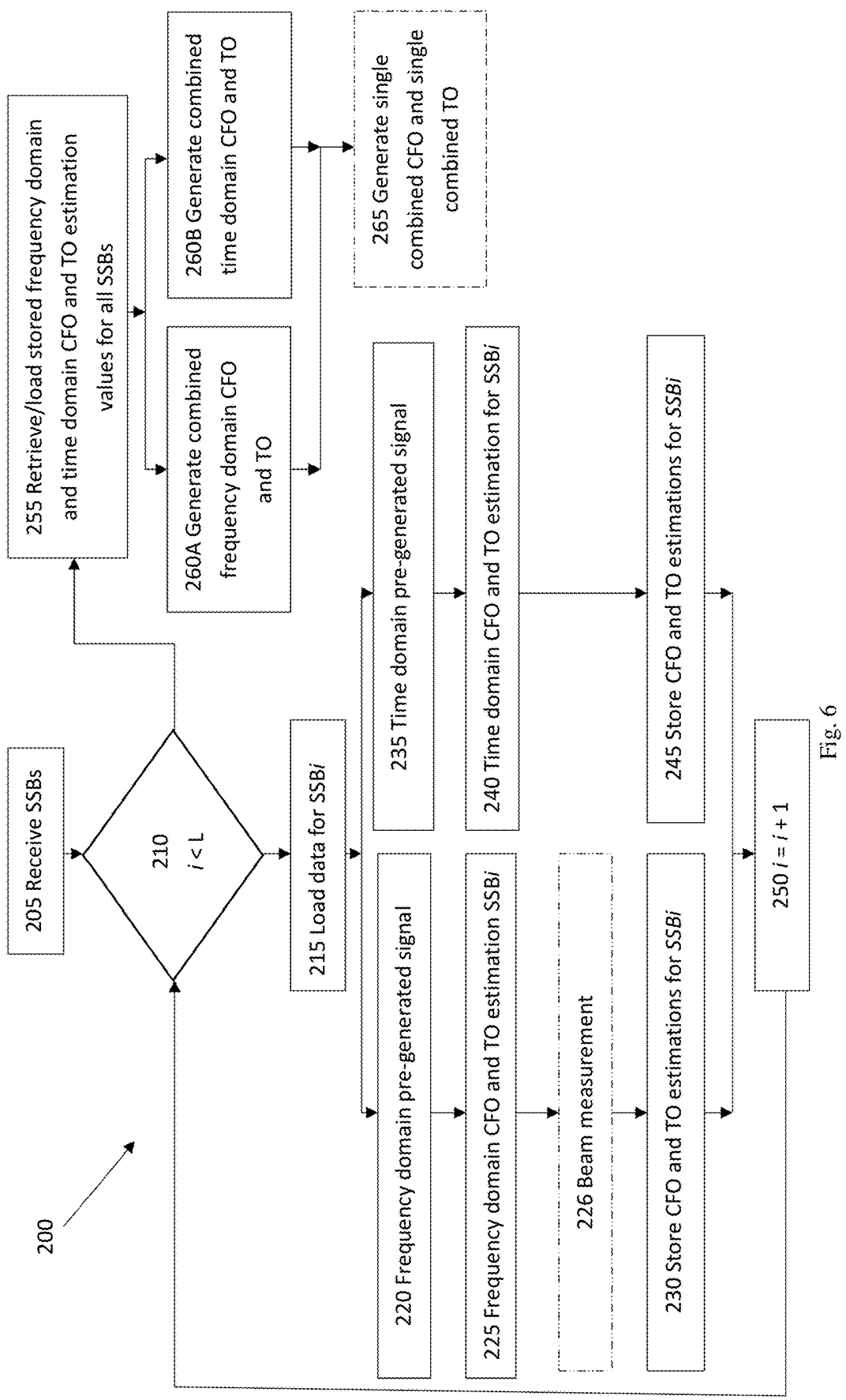
FIG. 6 is a flow diagram of a first method in accordance with the invention.

FIG. 6 shows a preferred method 200 in accordance with the invention for determining improved CFO and TO estimation values.

Referring to FIG. 6, in a first step 205 of method 200, the signal detection module 130 receives SSBs of a SS Burst detected at the radio equipment device 100. In a decision box 210, the signal detection module 130 determines whether or not an SSB index number i of a first one of the received SSBs is less than the maximum value L for possible SSB index values. So, if i<L then, in step 215, the signal detection module 130 loads the pre-generated data for the SSB having SSB current index value i.

In step 220, the signal detection module 130 generates frequency domain signals for the PSS, SSS and PBCH signals comprising said SSB to provide a frequency domain pre-generated signal for said SSB. Generation of the frequency domain pre-generated signal may include generating a frequency domain signal of a saved decoded SIB signal retrieved from a decoded PDSCH.

In step 225, the signal detection module 130 performs frequency domain CFO and TO estimation for each of the PSS, SSS and PBCH of the frequency domain pre-generated signal and, in step 230, it stores the resulting frequency domain CFO and TO estimation values in memory 140.

In step 235, the signal detection module 130 generates a time domain pre-generated signal from the frequency domain pre-generated signal by generating time domain signals for the PSS, SSS and PBCH from said from frequency domain pre-generated signal. Generation of the time domain pre-generated signal may include generating a time domain signal of the saved decoded SIB signal retrieved from the decoded PDSCH.

In step 240, the signal detection module 130 performs time domain CFO and TO estimation for each of the PSS, SSS and PBCH of the time domain pre-generated signal and, in step 245, stores the resulting time domain CFO and TO estimation values in memory.

In step 250, the signal detection module 130 increments the SSB index value by 1 and returns to decision box 210 for a next one of the received SSBs. Steps 210 to 250 are repeated for each next received SSB until the signal detection module 130 determines, at decision box 210, that a next SSB index value i=L.

In response to a determination at decision box 210 that a next SSB index value i=L, the signal detection module 130 retrieves from memory 140, in step 255, the stored frequency domain PSS, SSS and PBCH CFO and TO estimation values and the time domain PSS, SSS and PBCH CFO and TO estimation values.

In step 260A, the signal detection module 130 generates: a combined frequency domain CFO estimation value from some or all of the retrieved frequency domain PSS, SSS and PBCH CFO estimation values or a combined frequency domain TO estimation value from some or all of the retrieved frequency domain PSS, SSS and PBCH TO estimation values. It will be understood, however, that in some embodiments the combining of PSS, SSS and PBCH frequency domain CFO/TO estimation values could be performed at step 225 and so the sequence of steps depicted in FIG. 6 is not essential to the performance of the method of the invention.

The combined frequency domain CFO estimation value may be obtained by selecting, for each SSB, an optimal CFO estimation value from that SSB's retrieved frequency domain PSS, SSS and PBCH CFO estimation values and then combining the selected frequency domain CFO estimation values for some or all of the SSBs. Adding the PBCH as a reference signal to obtain its CFO estimation value improves the estimation results compared to the situation where only estimation results from the PSS and SSS are considered when selecting an optimal CFO estimation value.

Alternatively, the combined frequency domain CFO estimation value may be obtained by combining the PSS, SSS and PBCH CFO estimation values for each SSB with weight values derived from respective measured signal strengths of the PSS signal, SSS signal and PBCH signal comprising said SSB to obtain an SSB frequency domain CFO estimation value and then combining the SSB frequency domain CFO estimation values for some or all of the SSBs. Combining the SSB frequency domain CFO estimation values for some or all of the SSBs may comprise determining a mean or average value of said SSB frequency domain CFO estimation values.

It will be understood that combined frequency domain TO estimation value may be obtained by the same methodology as for the combined frequency domain CFO estimation value.

In step 260B, the signal detection module 130 generates: a combined time domain CFO estimation value from some or all of the retrieved frequency domain PSS, SSS and PBCH CFO estimation values, or a combined time domain TO estimation value from some or all of the retrieved frequency domain PSS, SSS and PBCH TO estimation values.

It will be understood that each of the combined time domain CFO estimation value and the combined time domain TO estimation value may be obtained by the same methodology as for the combined frequency domain CFO estimation value.

In a final optional step 265, a single combined CFO estimation value may be obtained by combining the combined frequency domain CFO estimation value and the combined time domain CFO estimation value or a single combined TO estimation value may be obtained by combining the combined frequency domain TO estimation value and the combined time domain TO estimation value.

Figure 7:
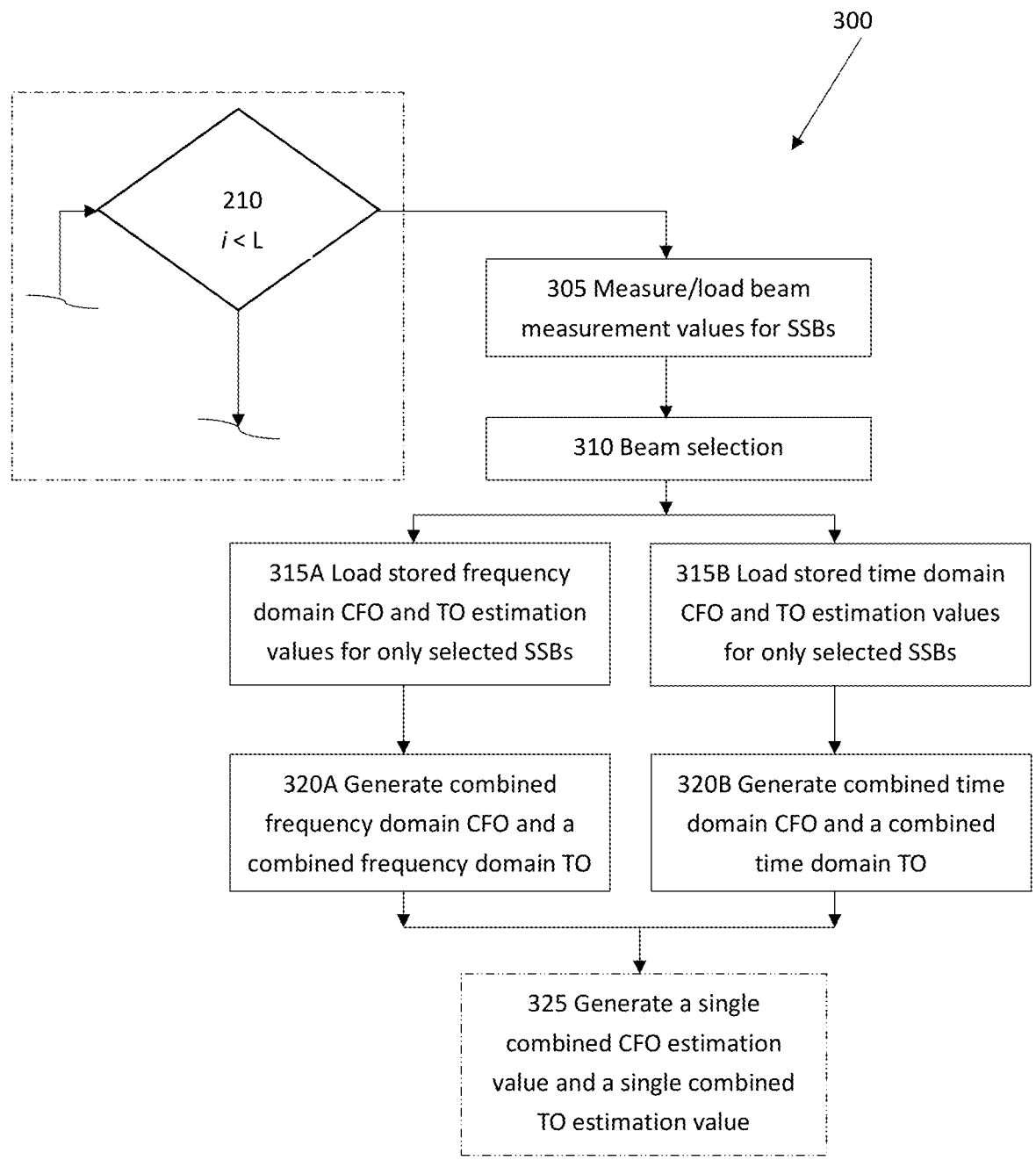
FIG. 7 is a flow diagram of a modified method in accordance with the invention.

Referring now to FIG. 7, a more preferred method 300 of generating the combined frequency domain CFO estimation value, the combined frequency domain TO estimation value, the combined time domain CFO estimation value and the combined time domain TO estimation value includes combining CFO and TO estimation values from some selected beams from the set of beams associated with said received SSBs. The method 300 comprises a set of initial steps which comprise steps 205 to 250 of FIG. 6 (denoted by the dashed line box in FIG. 7) which, for convenience are not described again or shown in detail in FIG. 7. A remaining set of steps completing the method 300 is depicted in FIG. 7.

Referring to FIG. 7, in response to a determination at decision box 210 of FIG. 6 that a next SSB index value i=L, the signal detection module 130, in step 305, loads beam measurement values for the respective beams for each of the SSBs. Step 305 may include establishing the beam measurement values for the respective beams for each of the SSBs, but a beam measurement step may be included in method 200 of FIG. 6. In the event that the beam measurement step is included in the method 200 of FIG. 6 rather than forming part of step 305 of method 300, the beam measurement step in method 200 may be implemented as step 226 between steps 225 and 230 and step 230 modified to include storing the beam measurement value with the resulting frequency domain CFO and TO estimation values in memory 140.

Figure 8:
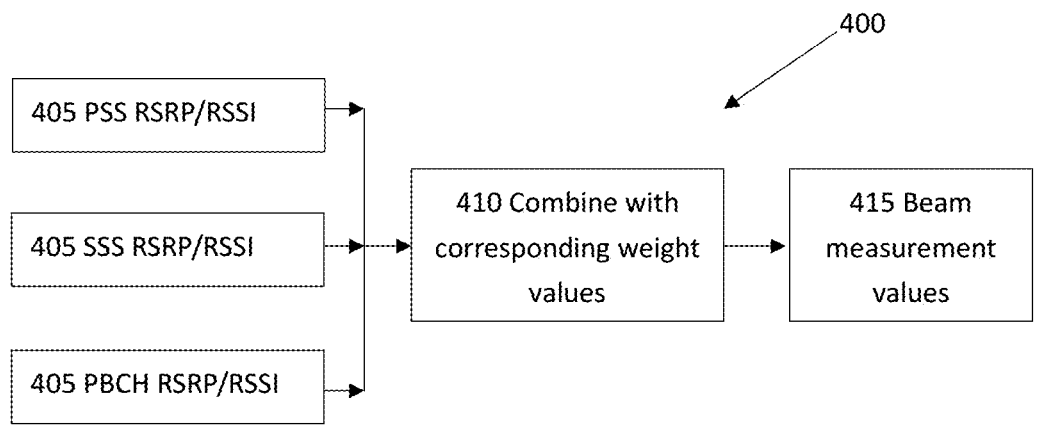
FIG. 8 is a schematic diagram of a beam measurement value process.

In either case, the beam measurement process 400, as illustrated by FIG. 8, may comprise, for each SSB, the signal detection module 130 measuring in the frequency domain, in step 405, the RSRP or RSSI value for each of the PSS, SSS and PBCH of each SSB. The beam measurement process may include the signal detection module 130 combining, in step 415, the respective PSS RSRP/RSSI, SSS RSRP/RSSI and PBCH RSRP/RSSI values to provide a single beam measurement value for each SSB.

Figure 11:
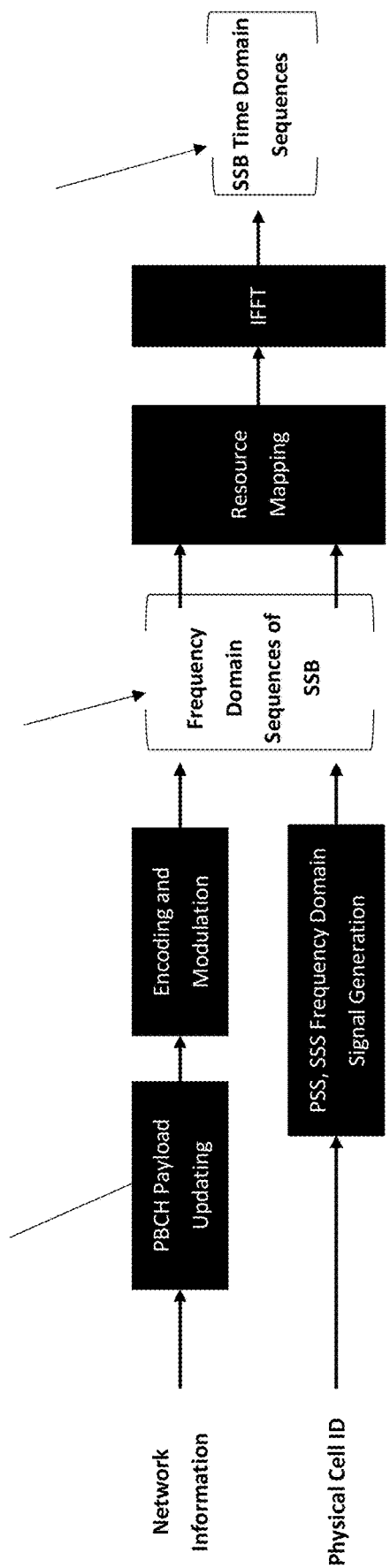
FIG. 11 is a schematic diagram illustrating a time and frequency sequences pre-generation method for each SSB.

The methods in accordance with the invention may be applied to each SS Burst in a received SS Burst Set. In such a case, the methods may include receiving the system and dynamically generating system information signals including any one or more of: physical cell ID, time-frequency resource block boundary of a master information block (MIB) derived from the PBCH, a SIB, SS burst signals, beam index of each SSB in the SS Burst, and the payload bits of the MIB and optionally the SIB signals. The methods may be modified to include the step of updating a signal frame number (SFN) and respective payloads for each SSB on receiving a next SS Burst in the SS Burst Set. This is more fully illustrated in FIG. 11. The frequency domain pre-generated signal comprises the PSS signal, the SSS signal and PBCH signal for each SSB, and optionally the SIB signal. The time and frequency sequences pre-generation method for each SSB illustrated by FIG. 11 involves PBCH payload updating 610 comprising generating, for each PBCH of each SSB, a set of MIB payload bits including SFN related bits, which are updated periodically, and beam index related bits which differ between SSBs. Then, at 620, generating for each SSB the frequency domain signals for PSS, SSS and PBCH respectively. At 630, the SSB time domain sequences for each SSB are generated for PSS, SSS and PBCH respectively. For the SIB, the frequency and time domain sequences are optionally generated based on saved SIB decoded information.

Figure 9:
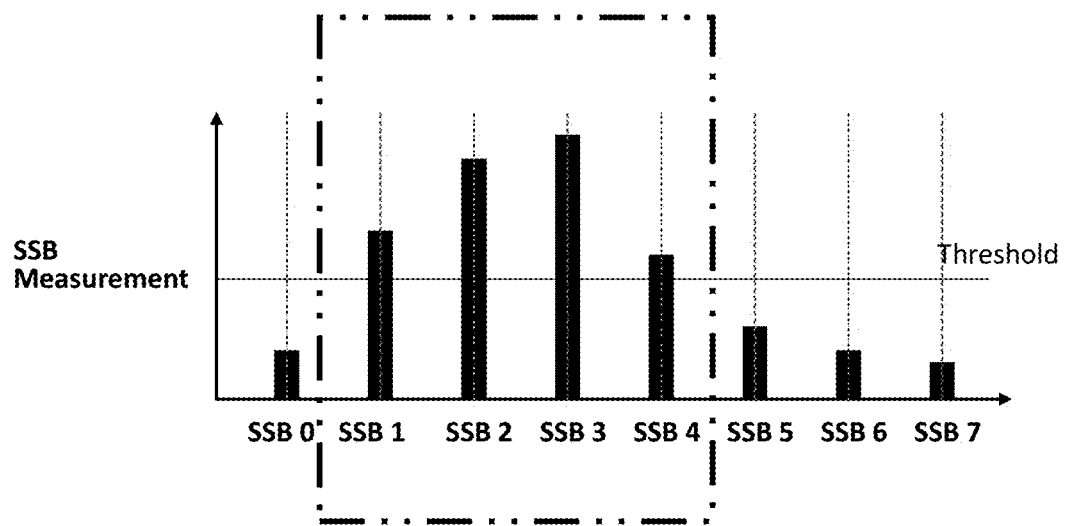
FIG. 9 is a diagram illustrating beam selection based on a threshold in accordance with the invention.

Referring again to FIG. 7 and having loaded into memory 140 in step 305 the beam measurement values for each of the SSBs respective beams, the method includes the step 310 of the signal detection module 130 selecting some of the beams (SSBs) based on their respective beam measurement values. To do so, a predetermined, selected or calculated threshold is established. In one non-limiting example for some embodiments, the threshold may be set to configure a selected number of beams. For example, the threshold may be set to "2" so that the two best beam values are selected for combination. In some other embodiments, the threshold may be set by reference to which beams have a larger than, for example, average power. As illustrated in FIG. 9, only those beams having a beam measurement value equal to or higher than the threshold are selected as denoted by the dashed line in FIG. 9.

In step 315A, the signal detection module 130 retrieves from memory 140 the stored frequency domain PSS, SSS and PBCH CFO and TO estimation values for only the selected beams, i.e. for only the SSBs of said selected beams.

In step 315B, the signal detection module 130 retrieves from memory 140 the stored time domain PSS, SSS and PBCH CFO and TO estimation values for only the selected beams.

In step 320A, the signal detection module 130 generates: a combined frequency domain CFO estimation value from the retrieved frequency domain CFO estimation values for each SSB for the selected beams; and a combined frequency domain TO estimation value from the retrieved frequency domain TO estimation values for each SSB for the selected beams.

In step 320B, the signal detection module 130 generates: a combined time domain CFO estimation value from the retrieved time domain CFO estimation values for each SSB for the selected beams; and a combined time domain TO estimation value from the retrieved time domain TO estimation values for each SSB for the selected beams.

In a final optional step 325, a single combined CFO estimation value may be obtained by combining the combined frequency domain CFO estimation value and the combined time domain CFO estimation value or a single combined TO estimation value may be obtained by combining the combined frequency domain TO estimation value and the combined time domain TO estimation value.

It will be understood that the methodology applied in steps 255 to 265 of FIG. 6 may also be generally applied to steps 315 to 325 of FIG. 7 but limited to the selected beams.

Figure 10:
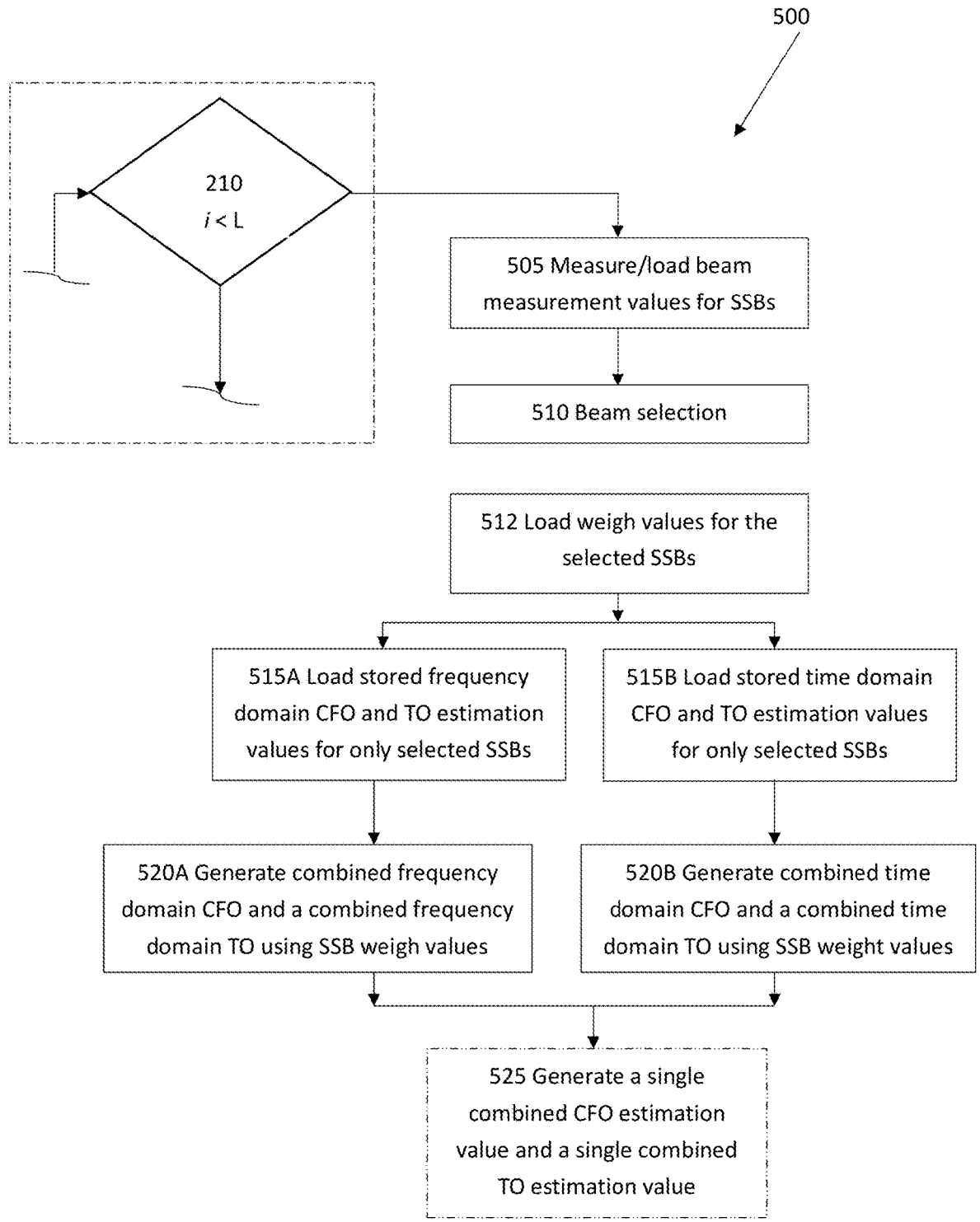
FIG. 10 is a flow diagram of a further modified method in accordance with the invention.

The method 300 of FIG. 7 may be modified, as shown in FIG. 10, to provide a modified method 500 which utilizes weight values when determining CFO and TO estimation values.

Referring again to FIG. 10, the modified method 500 comprises step 505 of the signal detection module 130 loading the beam measurement values for each of the SSBs respective beams. In a next step 510, the signal detection module 130 selects some of the beams (SSBs) based on their respective beam measurement values compared to a predetermined, selected or calculated threshold. As illustrated in FIG. 9, only those beams having a beam measurement value equal to or higher than the threshold are selected.

In a next step 512, the signal detection module 130 loads from memory 140 the weight values for each of the SSBs.

In step 515A, the signal detection module 130 retrieves from memory 140 the stored frequency domain CFO and TO estimation values for each SSB for only the selected beams, i.e. for only the SSBs of said selected beams.

In step 515B, the signal detection module 130 retrieves from memory 140 the stored time domain CFO and TO estimation values for each SSB for only the selected beams.

In step 520A, the signal detection module 130 generates: a combined frequency domain CFO estimation value from the retrieved frequency domain CFO estimation values for each SSB for the selected beams and the respective weight values for the selected beams; and a combined frequency domain TO estimation value from the retrieved frequency domain TO estimation values for each SSB for the selected beams and the respective weight values for the selected beams.

In step 520B, the signal detection module 130 generates: a combined time domain CFO estimation value from the retrieved time domain CFO estimation values for each SSB for the selected beams and the respective weight values for the selected beams; and a combined time domain TO estimation value from the retrieved time domain TO estimation values for each SSB for the selected beams and the respective weight values for the selected beams.

In a final optional step 525, a single combined CFO estimation value may be obtained by combining the combined frequency domain CFO estimation value and the combined time domain CFO estimation value and a single combined TO estimation value may be obtained by combining the combined frequency domain TO estimation value and the combined time domain TO estimation value.

It will be understood that the methodology applied in steps 255 to 265 of FIG. 6 may be generally applied to steps 515 to 525 of FIG. 10 but limited to the selected beams and modified by the weight values of the selected beams.

The method of generating the frequency and time domain pre-generated signals may include receiving, from a gNodeB, the sets of system information, obtaining the PCI, time-frequency resource block boundary of the MIB, SIB and SS Burst signals, beam index of each SSB and the payload bits of MIB and SIB signals and generating the system information signals dynamically in the time and frequency domains. The method may include determining whether or not to update the time and frequency domain pre-generated signals based on MIB and SIB decoding results. These method steps find particular use when processing successive SB Bursts in a SS Burst Set.

In the frequency domain, the TO for each SSB can be obtained by using a signal pre-generated based cross-correlation method to compute the phase shift value $T_T$ between different sub-carriers.

Also, in the frequency domain, the CFO for each SSB can be obtained by using a signal pre-generated based cross-correlation method to compute the integer CFO $\hat{\varepsilon}_I$ and fractional CFO $\hat{\varepsilon}_F$.

In the time domain, both the CFO and TO can be obtained by a cross-correlation method.

The beam measurement value for each SSB may be obtained by a joint symbol-based estimation method.

The radio equipment device may comprise UE or a network sniffer device in a New Radio (NR) 5G wireless communication network. The network sniffer device may comprise part of a gNodeB.

The invention also provides a non-transitory computer-readable medium storing machine-readable instructions, wherein, when the machine-readable instructions are executed by a processor, they configure the processor to: for each of a plurality of synchronization signal (SS) blocks (SSBs) in a SS Burst detected at said radio equipment, determine a CFO estimation and/or a TO estimation; and for at least some of said detected SSBs, combine the CFO estimations and/or the TO estimations to obtain improved CFO compensation and/or improved TO compensation for signal processing at said radio equipment.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of performing carrier frequency offset (CFO) estimation and/or time offset (TO) estimation at a radio equipment in a mobile communications system, the method comprising:
    for each of a plurality of synchronization signal (SS) blocks (SSBs) in a SS Burst detected at said radio equipment, determining a CFO estimation and/or a TO estimation based on network information signal prediction; and
    for at least some of said detected SSBs, combining the CFO estimations and/or the TO estimations to obtain improved CFO compensation and/or improved TO compensation for signal processing at said radio equipment;
    wherein the method includes, for each of said detected SSBs, determining: (i) a frequency domain CFO estimation and a frequency domain TO estimation; and/or (ii) a time domain CFO estimation and a time domain TO estimation; and performing at least one of the steps of:
    combining the frequency domain CFO and TO estimations with corresponding weight values for said at least some of said detected SSBs to obtain improved frequency domain CFO and TO compensation for signal processing at said radio equipment; and/or
    combining the time domain CFO and TO estimations with corresponding weight values for said at least some of said detected SSBs to obtain improved time domain CFO and TO compensation for signal processing at said radio equipment.

2. The method of claim 1, wherein, for each of the plurality of SSBs in said SS Burst detected at the radio equipment, the CFO estimation and the TO estimation is determined from the respective SSB's primary synchronization signal (PSS), secondary synchronization signal (SSS) and Physical Broadcast Channel (PBCH) signal.

3. The method of claim 2, wherein the step of combining comprises selecting the optimal CFO and/or TO from the CFOs and/or TOs for the respective SSB's PSS, SSS and PBCH signals.

4. The method of claim 1, wherein a method of selecting some of said plurality of SSBs in said SS Burst for combining the CFO estimations and/or the TO estimations comprises:
    (a) determining a value for a parameter of a beam associated with an SSB;
    (b) comparing the determined parameter value with a predetermined, selected or calculated threshold;
    (c) if the determined parameter value is less than the threshold then disregarding any CFO and/or TO estimations for said SSB associated with the beam; or if the determined parameter value is equal to or greater than the threshold then selecting the SSB for the step of combining the CFO estimations and/or the TO estimations; and
    (d) repeating steps (a) to (c) for each SSB of said plurality of SSBs.

5. The method of claim 4, wherein the parameter of a beam associated with an SSB comprises a reference signal received power (RSRP) or a received signal strength indicator (RSSI).

6. The method of claim 5, wherein the method of determining a value of the RSRP or the RSSI for a beam comprises measuring, in the frequency domain, the RSRP value or the RSSI value for each of the beam's associated PSS, SSS and PBCH signals.

7. The method of claim 6, wherein the RSRP values or the RSSI values for the beam's associated PSS, SSS and PBCH signals are combined to provide a combined RSRP value or a combined RSSI value as a beam measurement value for each SSB, wherein the method includes comparing the beam measurement value to the threshold.

8. The method of claim 7, wherein the RSRP values or the RSSI values for the beam's associated PSS, SSS and PBCH signals are combined with a corresponding weight value.

9. The method of claim 8, wherein the corresponding weight value is derived from a number of resources occupied by PSS, SSS and PBCH signals.

10. The method of claim 9, wherein the step of combining the frequency domain/time domain CFO and TO estimations for said at least some of said SSBs to obtain improved CFO and TO compensation includes using the corresponding weight values for the beams comprising said SSBs.

11. The method of claim 1, wherein the frequency domain CFO estimation and the frequency domain TO estimation for an SSB in said SSB Burst are derived from a frequency domain pre-generated signal comprising the SSS signal, PSS signal and PBCH signal for the SSB.

12. The method of claim 11, wherein generating the frequency domain pre-generated signal includes generating frequency domain signals for each of the SSS signal, the PSS signal and the PBCH signal for the SSB and optionally generating a frequency domain signal for the SIB.

13. The method of claim 12, wherein the time domain CFO estimation and the time domain TO estimation for an SSB in said SSB Burst are derived from a time domain pre-generated signal generated from said frequency domain pre-generated signal.

14. The method of claim 1, including the steps of: receiving system information from a network node of said mobile communications network; and dynamically generating system information signals including any one or more of: physical cell ID, time-frequency resource block boundary of a master information block (MIB) derived from the PBCH, a SIB, SS burst signals, beam index of each SSB in the SS Burst, and the payload bits of the MIB and the SIB signals.

15. The method of claim 14, including the step of updating a signal frame number (SFN) in PBCH payloads for each SSB on receiving a next SS Burst in a SS Burst Set.

16. The method of claim 1, wherein the radio equipment comprises a user equipment (UE) or a network sniffer device in a 5G mobile communications network.

17. A radio equipment in a mobile communications system, the radio equipment comprising:
a memory storing machine-readable instructions; and
a processor for executing the machine-readable instructions such that, when the processor executes the machine-readable instructions, it configures the radio equipment to:
for each of a plurality of synchronization signal (SS) blocks (SSBs) in a SS Burst detected at said radio equipment, determine a CFO estimation and/or a TO estimation based on network information signal prediction; and
for at least some of said detected SSBs, combine the CFO estimations and/or the TO estimations to obtain improved CFO compensation and/or improved TO compensation for signal processing at said radio equipment;
including for each of said detected SSBs, determining: (i) a frequency domain CFO estimation and a frequency domain TO estimation; and/or (ii) a time domain CFO estimation and a time domain TO estimation; and performing at least one of the steps of:
combining the frequency domain CFO and TO estimations with corresponding weight values for said at least some of said detected SSBs to obtain improved frequency domain CFO and TO compensation for signal processing at said radio equipment; and/or
combining the time domain CFO and TO estimations with corresponding weight values for said at least some of said detected SSBs to obtain improved time domain CFO and TO compensation for signal processing at said radio equipment.

18. A non-transitory computer-readable medium storing machine-readable instructions, wherein, when the machine-readable instructions are executed by a processor, they configure the processor to:
for each of a plurality of synchronization signal (SS) blocks (SSBs) in a SS Burst detected at said radio equipment, determine a CFO estimation and/or a TO estimation based on network information signal prediction; and
for at least some of said detected SSBs, combine the CFO estimations and/or the TO estimations to obtain improved CFO compensation and/or improved TO compensation for signal processing at said radio equipment;
including for each of said detected SSBs, determining: (i) a frequency domain CFO estimation and a frequency domain TO estimation; and/or (ii) a time domain CFO estimation and a time domain TO estimation; and performing at least one of the steps of:
combining the frequency domain CFO and TO estimations with corresponding weight values for said at least some of said detected SSBs to obtain improved frequency domain CFO and TO compensation for signal processing at said radio equipment; and/or
combining the time domain CFO and TO estimations with corresponding weight values for said at least some of said detected SSBs to obtain improved time domain CFO and TO compensation for signal processing at said radio equipment.

* * * * *